Figure 1:
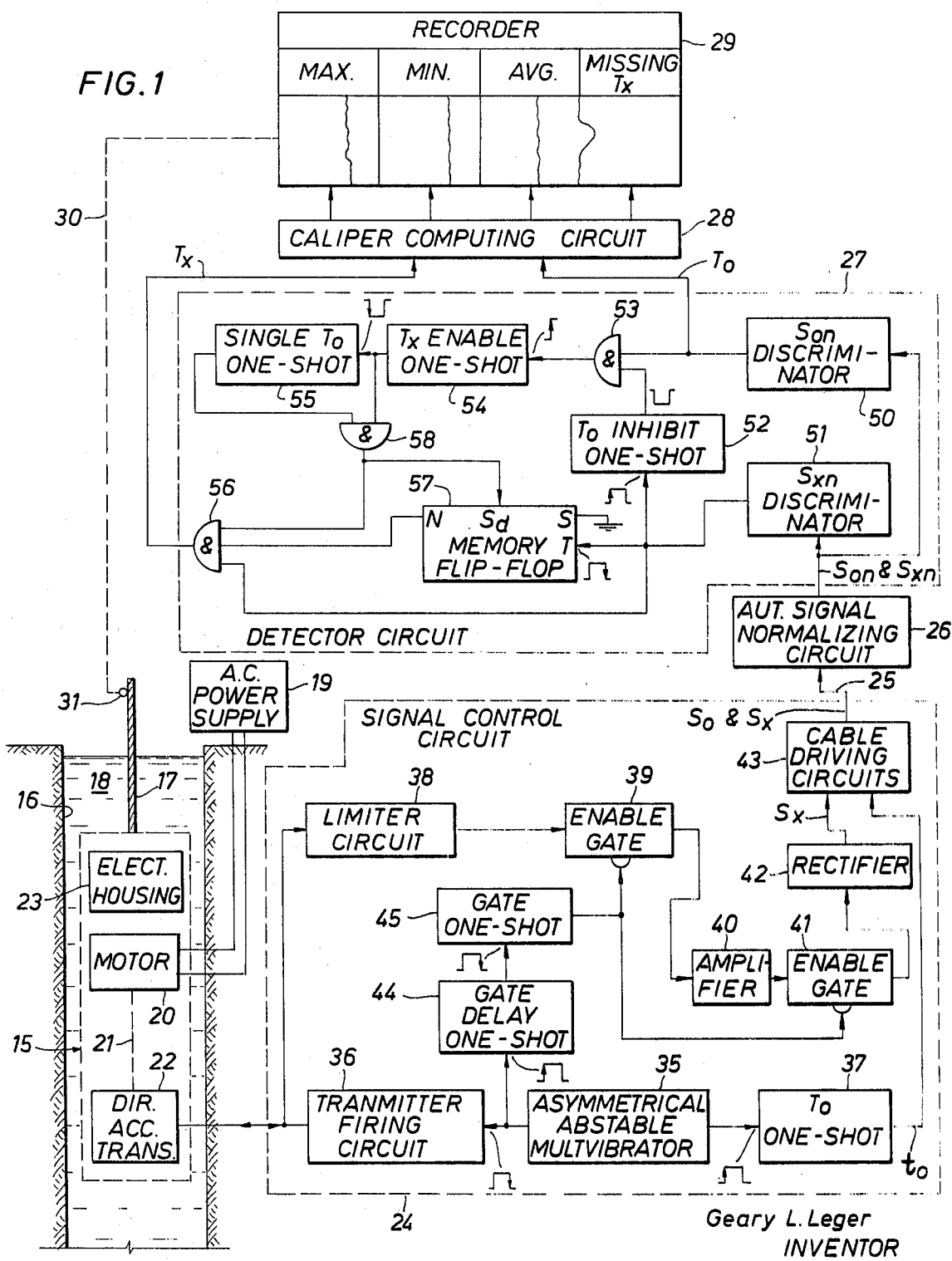

United States Patent

[11] 3,590,940

[72] Inventor Geary L. Leger
 Yucaipa, Calif.
[21] Appl. No. 827,798
[22] Filed May 26, 1969
[45] Patented July 6, 1971
[73] Assignee Schlumberger Technology Corporation
 New York, N.Y.

[54] WELL-LOGGING APPARATUS
 16 Claims, 34 Drawing Figs.

[52] U.S. Cl. .................................................. 181/.5 BE,
 73/151
[51] Int. Cl. ...................................................... E21b 47/08,
 G01v 1/00
[50] Field of Search .......................................... 181/.5 BE;
 73/151

[56] References Cited
 UNITED STATES PATENTS
 2,595,241 5/1952 Goble ............................ 181/0.5 BE
 3,502,169 3/1970 Chapman, III ................. 340/18 X
 3,503,038 3/1970 Baldwin ......................... 181/.5 BE Primary Examiner—Malcolm F. Hubler
Attorneys—Ernest R. Archambeau, Jr., John P. Sinnott, David L. Moseley, Edward M. Roney, Willaim R. Sherman, Willaim J. Beard and Stewart F. Moore ABSTRACT: In accordance with an illustrative embodiment of the present invention, a well tool having a rotating transducer is moved through a well bore. The transducer is repetitively energized to emit acoustic energy into the media surrounding the well too, which energy is reflected off of various circumferential portions of the well bore wall and returned to the rotating transducer. An electrical signal pulse is developed in response to each burst of reflected energy received by the transducer and this pulse, along with an electrical sync pulse representative of the time at which the transducer is energized, is transmitted to the surface of the earth. At the surface of the earth, the time relationship of the sync and signal pulses to one another is measured to provide information concerning the average well bore radius or diameter, well bore eccentricity, as well as information as to the authenticity of these caliper measurements. To provide this information, the time spacing between the sync and signal pulses is converted to an amplitude signal. This amplitude signal is then filtered to provide an average radius measurement and the maximum and minimum amplitude levels of this amplitude signal per revolution or so of the rotating transducer are measured to provide maximum and minimum radius measurements. To check the authenticity of these measurements, circuits are provided for determining if there is a signal pulse for every sync pulse.

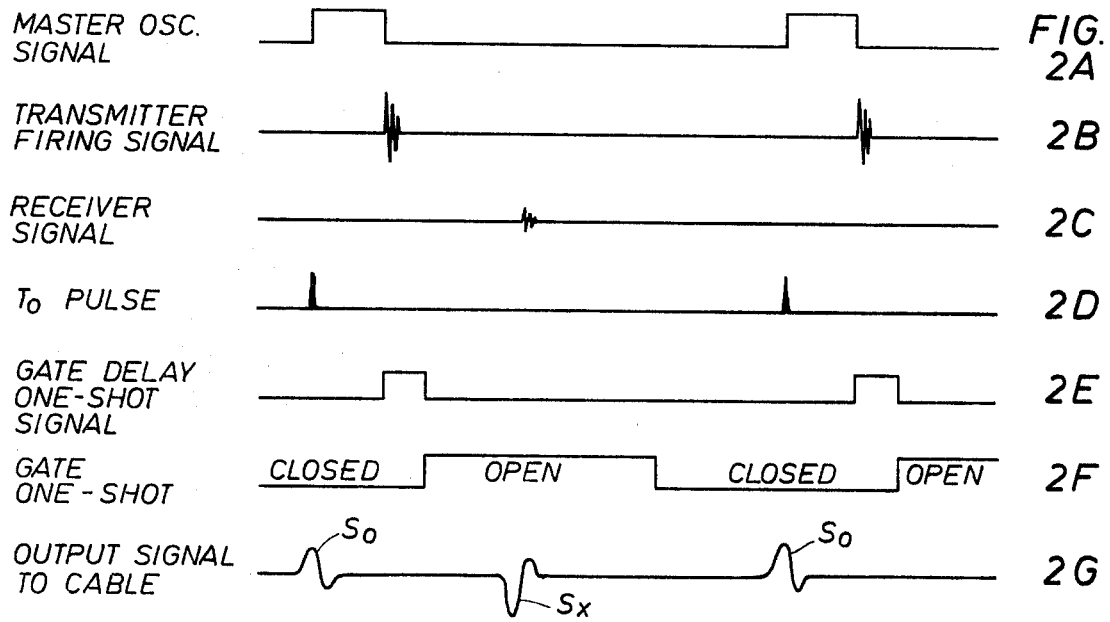
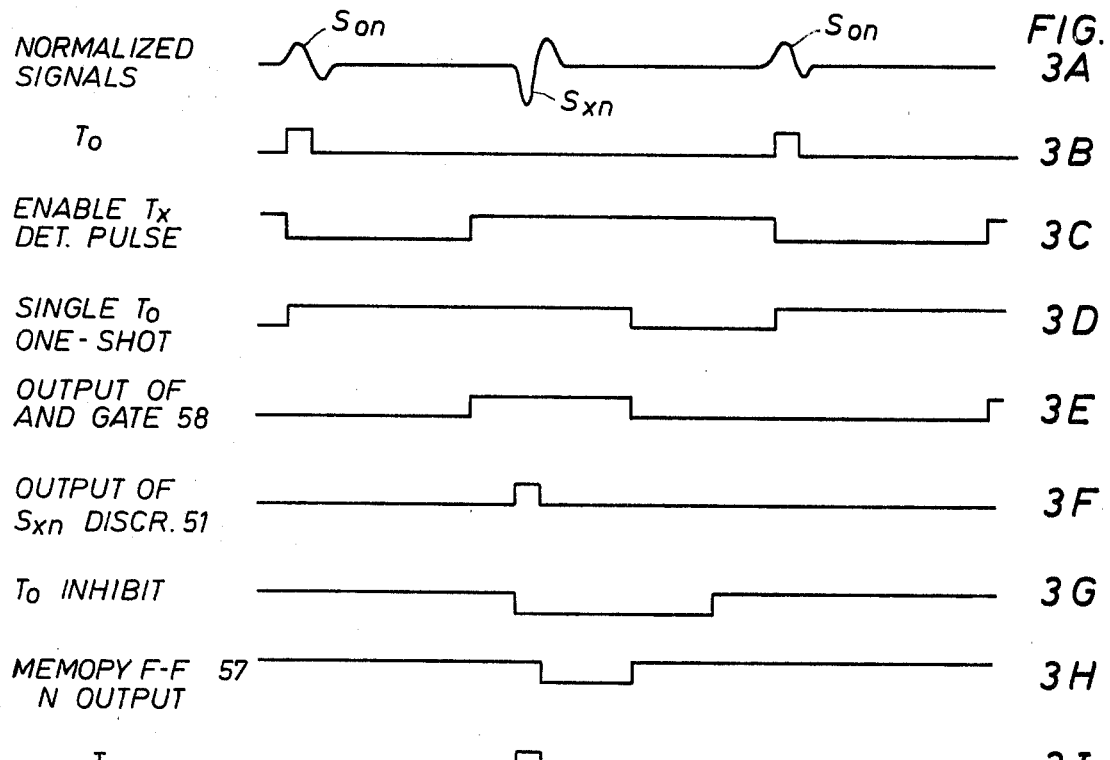

Geary L. Leger
INVENTOR

BY Edward M. Roney
ATTORNEY

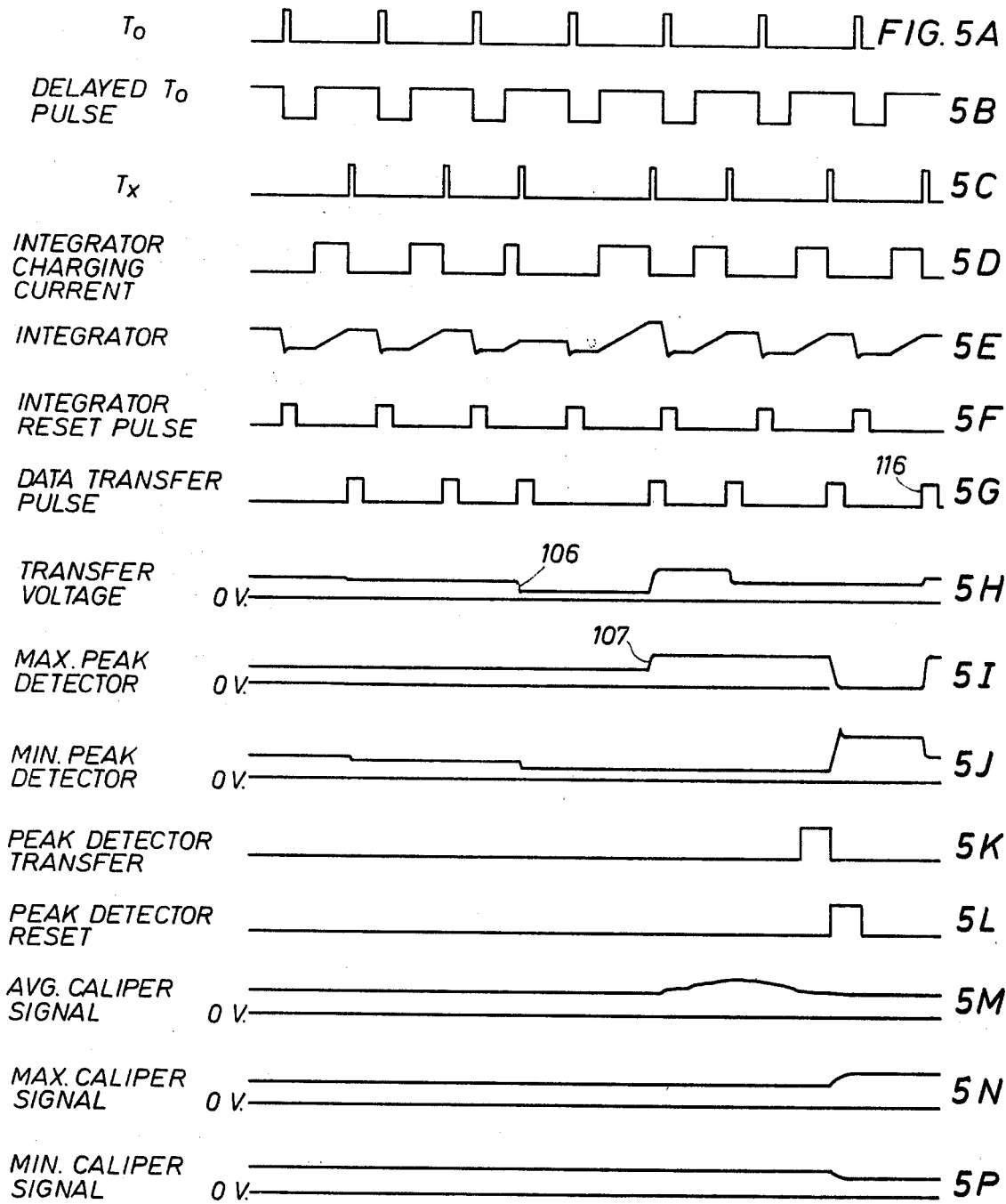

WELL-LOGGING APPARATUS

This invention relates to methods and apparatus for investigating the media surrounding a well tool lowered into a well bore on the end of a cable, and more particularly to that type of well-logging system which emits acoustic energy from a well tool into the surrounding media and receives energy reflected back from the wall of the well bore.

In borehole systems of the type involved here, the borehole is scanned through 360° by a rotating transducer means which repetitively emits a burst of high frequency acoustic energy and is responsive to the reflected energy to provide a voltage signal representative of the intensity of the reflected energy. While investigating through successive 360° scans, the well tool is slowly moved through the borehole. For each burst of transmitted energy, the intensity of the reflected energy is dependent upon the character of the media surrounding the well tool. The relative amplitude of the pulse signals developed by the transducer have been found to indicate the presence of anomalies such as holes, cracks, etc. in the wall of a borehole.

The pulse signal developed by the transducer can then be supplied to the intensity input terminal of an oscilloscope to regulate the intensity of the electron beam generated in the scope. The sweep of the electron beam is synchronized with the rotation of the transducer by utilizing a signal generated from the well tool indicative of the relative position of the rotating transducer means such that the electron beam will be swept across the face of the oscilloscope in synchronism with the rotation of the transducer means. Thus, since the intensity of the electron beam is modulated by the amplitude of the reflected energy received by the transducer means, each sweep across the face of the oscilloscope will provide information as to the media circumferentially surrounding the well tool.

By moving a recording medium past the face of the oscilloscope in synchronism with the movement of the well tool through the borehole, a picture of the media surrounding the well tool can be produced. Since the energy is reflected primarily from the well bore wall, this picture will likewise tend to be a picture of the well bore wall and thus can be utilized to indicate the existence of a hole, crack or soft spot in a particular portion of the well bore wall. In a cased well bore, such indications would provide information as to casing continuity, perforations, corrosions, etc. A system of the type above described can be found in copending application Ser. No. 697,796, filed by Joseph E. Chapman on Jan. 15, 1968, now U.S. Pat. No. 3,502,169.

While the system described in this copending Chapman application provides good results, it would be desirable to provide more information than just a picture of a well bore wall. In this connection, it would be desirable to provide information concerning the average radius or diameter and eccentricity of the well bore.

It is therefore an object of the present invention to provide new and improved methods and apparatus for use with well-logging systems.

It is another object of the present invention to provide new and improved methods and apparatus for use with systems which circumferentially scan the media surrounding a well tool.

It is an additional object of the present invention to provide new and improved methods and apparatus for measuring the radius or diameter and eccentricity of a well bore through which a well tool is moved.

In accordance with the present invention, well-logging methods and apparatus comprise moving a well tool through a well bore, which well tool has means for repetitively and directionally emitting and receiving energy in a media surrounding the well tool and producing electrical signal pulses representative of the received energy and electrical sync pulses representative of the time of energy emission. The energy emitting and receiving means is rotated so that the emitted energy will be sequentially directed at various circumferential portions of the well bore wall. The resulting pulses are transmitted to the surface of the earth for further processing.

At the surface of the earth, the pulses are first amplitude normalized and then applied to a detector means which operates to detect and separate the sync and signal pulses and generates two timing pulses, designated $T_o$ and $T_x$, representative of the time of occurrence of the sync and signal pulses respectively.

In accordance with important features of the present invention, these $T_o$ and $T_x$ timing pulses can be utilized to determine the average, maximum, and minimum well bore radius or diameter. To this end, the time separation between the $T_o$ and $T_x$ pulses is converted to a voltage signal proportional to this time separation. This voltage signal can then be filtered and recorded to produce an average radius or diameter measurement. Moreover, one or both of the maximum or minimum radius can be determined by measuring the maximum and/or minimum amplitude level per 360° (or thereabouts) scan of the rotating transducer.

Moreover, in accordance with another feature of the present invention, the authenticity of the radius measurements can be determined by checking to see if there is a $T_x$ pulse for every $T_o$ pulse. If a plurality of $T_x$ pulses are missing, it will be known to ignore the radius measurements.

For a better understanding of the present invention, together with other and further objects thereof, reference is had to the following description taken in connection with the accompanying drawings, the scope of the invention being pointed out in the appended claims.

Figure 4A:
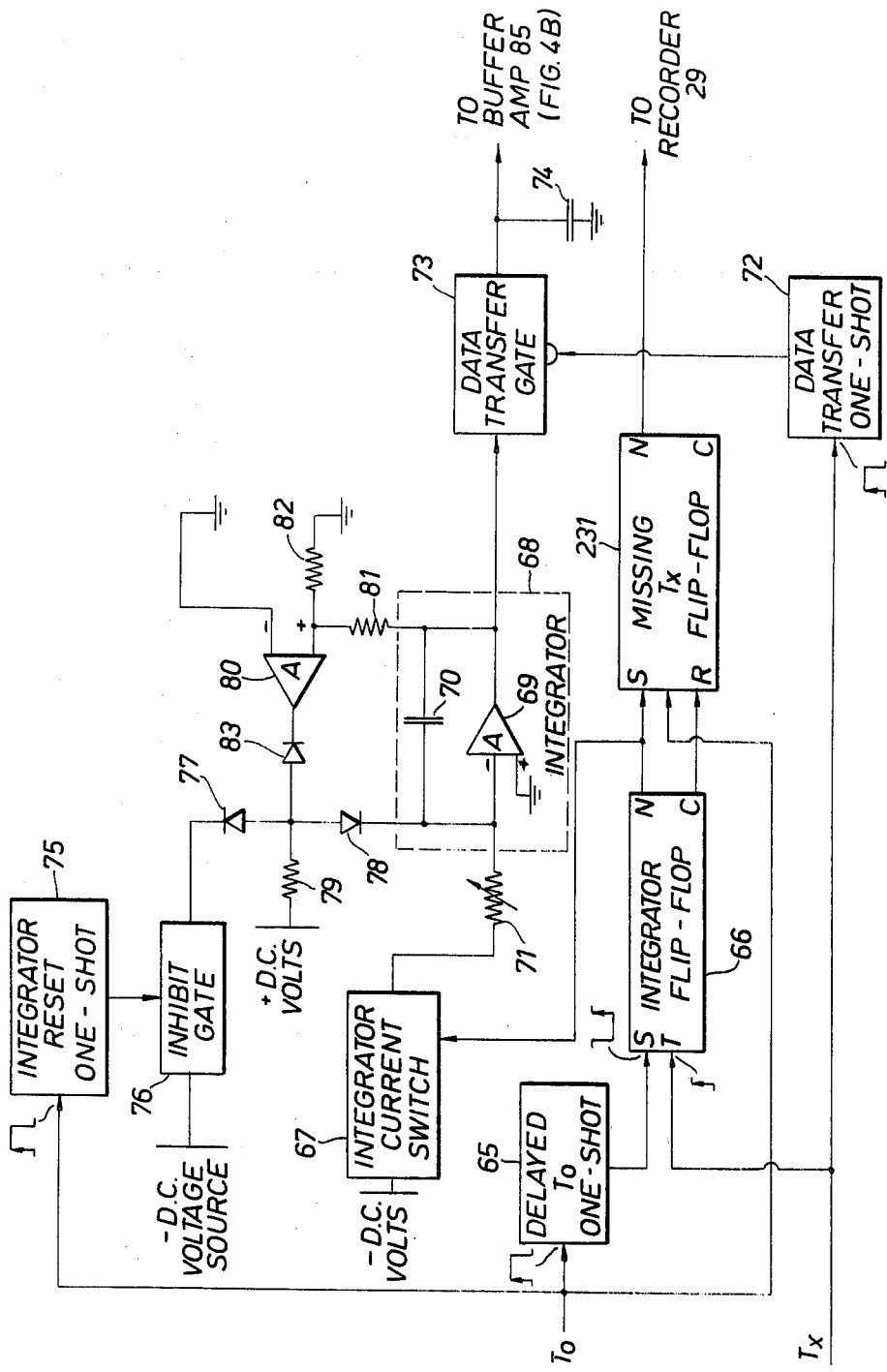
Figure 4B:
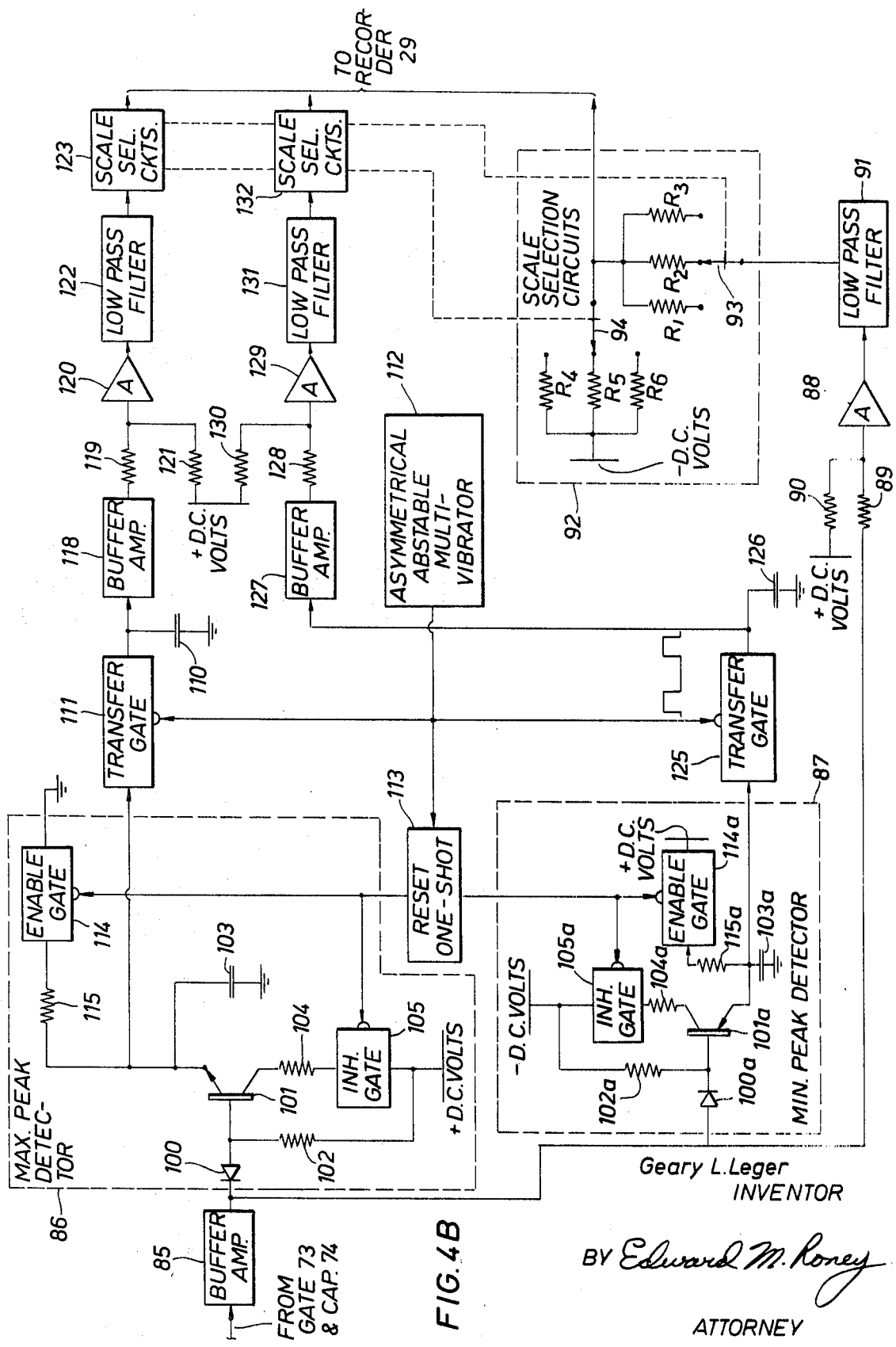

Referring to the drawings:

FIG. 1 illustrates a well tool in a well bore along with a schematic representation of electronic circuitry for use with the well tool in accordance with the present invention;

FIGS. 2A—2G shown waveform displays a signals appearing at various points in the downhole portion of the FIG. 1 circuitry;

FIGS. 3A—3I show waveform displays of signals appearing at various points in the surface electronic circuitry of FIG. 1;

FIGS. 4A and 4B show a portion of the FIG. 1 circuitry in greater detail in accordance with important features of the present invention; and FIGS. 5A—5P illustrate the waveforms of various signals found in the FIGS. 4A and 4B circuitry.

Referring now to FIG. 1, a well tool 15 is lowered into a borehole 16 on the end of an armored multiconductor cable 17 for investigating the media surrounding the well tool 15. This surrounding media includes a drilling mud 18 in the borehole 16, the wall of the borehole 16, (including the casing if the well bore is cased), and adjoining earth formations. The cable 17 is raised and lowered into the borehole 16 by a suitable drum and winch mechanism (not shown). The well tool 15 includes an electrical scanning motor 20 energized by AC power from a surface located AC power supply 19 for causing a shaft 21 to rotate at a known angular velocity. A directional acoustic transducer 22 is rotated by the shaft 21 so as to emit acoustic energy toward the wall of the borehole in selected angular directions and to receive that portion of the acoustic energy which is reflected back from the wall of the borehole 16. Thus, the directional acoustic transducer 22 will operate to continuously emit acoustic energy which is reflected off the borehole wall at a plurality of circumferential positions of this wall and returned to the directional acoustic transducer 22 as it rotates.

The downhole electronic circuitry contained by the electrical housing 23 includes a signal control circuit 24 which operates to repetitively energize the directional acoustic transducer 22 for emitting acoustic energy into the surrounding media and generate a transmitter firing pulse $T_o$ representative of the time at which the transducer was energized. The signal control circuit 24 also operates to produce a signal representative of the reflected acoustic energy received by the transducer 22 and convert this signal to a form suitable for transmission to the surface of the earth on a conductor 25. The transmitted signals representative of the transmitter firing time and reflected acoustic energy are designated $S_o$ and $S_x$ respectively.

Now concerning the surface electronic circuitry for processing the transmitter firing pulses $S_o$ and the received or re-reflected energy pulses $S_x$, the $S_o$ and $S_x$ pulses on conductor 25 are applied to an automatic signal-normalizing circuit 26 which, among other things, operates to normalize the signal strength of the received $S_o$ and $S_x$ pulses. Since the amplitude of the $S_o$ pulses can be controlled in the downhole signal control circuit 24, the $S_o$ pulses are sampled and the signal strength thereof is utilized to adjust a gain control circuit to thus normalize the signal strength of the received pulses. By so doing, such things as changes in cable attenuation can be compensated for.

The normalized $S_o$ and $S_x$ signals, designated $S_{on}$ and $S_{xn}$, are applied to detector circuit 27 which operates to distinguish between the $S_o$ and $S_x$ pulses and to produce timing pulses, designated $T_o$ and $T_x$, which are representative of the time of arrival of the $S_o$ and $S_x$ pulses at the surface of the earth. These $T_o$ and $T_x$ pulses are applied to a caliper computing circuit 28 which operates to measure the time separation between the $T_o$ and $T_x$ pulses to provide signals representative of the well bore radius or diameter.

The caliper circuits 28 supply a first signal representing the maximum radius of the well bore for each 360° scan of the borehole to a first channel of a recorder 29. Another signal representative of the average radius for each 360° scan is applied to a second channel of the recorder 29 and still another signal representative of the minimum radius for each 360° scan is supplied to a third channel of the recorder 29. Since the caliper computing circuits 28 measure the time interval between the $T_o$ and $T_x$ pulses to obtain the various diameter indications, the absence of $S_x$ pulses, and thus $T_x$ pulses may cause erroneous radius indications. To indicate such an occurrence, the caliper computing circuits supply another signal representative of missing $S_x$ (or $T_x$) pulses to a fourth channel of the recorder 29. Thus, if the recorded log indicates a plurality of $S_x$ pulses being missed, it is clear that the radius indications should be ignored. The record medium of the recorder 29 is driven as a function of well bore depth by a mechanical linkage 30 which is drive by a cable-engaging wheel 31.

Now concerning the internal configuration of the signal control circuit 24, refer to FIGS. 1 and 2A—2G in conjunction. An asymmetrical abstable multivibrator 35 generates the signal waveform of FIG. 2A for energizing a transmitter firing circuit 36 on the lagging or falling edges of the positive pulse portion of the multivibrator signal. The transmitter firing circuit 36 energizes the directional transducer 22 by way of an energy-coupling assembly (not shown) which is described in copending application Ser. No. 840,335 by Ralph G. Beil, filed on July 9, 1969 now abandoned. The resulting transmitter firing signal is shown in FIG. 2B and causes the acoustic transducer 22 to emit a burst of high frequency acoustic energy into the media surrounding the well tool 15. This acoustic energy radiates toward the borehole wall and at least a portion of the emitted acoustic energy is reflected back from the borehole wall provided the characteristic acoustic impedance of the borehole mud column and the adjoining formation are different. This reflected acoustic energy is, in the present embodiment, received by the same transducer 22 which initially emitted it to produce the receiver signal of FIG. 2C. If desired, separated side-by-side transducers could be utilized for the emitting and receiving operations.

The rising edges of the output signal from the multivibrator 35 energize a $T_o$ one-shot 37 for generating a $T_o$ pulse, shown in FIG. 2D, each time the transducer 22 is energized. These $T_o$ pulses are applied to suitable cable-driving circuits 43 for shaping and transmission to the surface of the earth. The signals applied to the cable, designated $S_o$, are shown in FIG. 2G. Since the time interval between the leading and falling edges of the positive pulse portion of the multivibrator signal of FIG. 2A is always fixed and known, each $S_o$ pulse will provide an indication at the surface of the earth of the time at which the transducer 22 is energized by the firing circuit 36.

Now concerning the receiver channel of the signal control circuit 35, the received signal of FIG. 2C is passed to a limiter circuit 38 whose amplitude level is set safely higher than the maximum expected amplitude level of the received signal but low enough to prevent saturation of or damage to the remainder of the receiver circuits by the high-energy transmitter firing signals. The received signal is then passed via a normally deenergized enable gate 39, amplifier 40, and a second enable gate 41 to a rectifier or demodulator circuit 42. The rectifier circuit 42 demodulates the received signal of FIG. 2C to produce the signal $S_x$ of FIG. 2G. This signal $S_x$ is then applied to the cable-driving circuits 43 for transmission to the surface of the earth.

Since the present embodiment, a single transducer 22 is utilized for both transmitting and receiving acoustic energy, the signal control circuit 24 includes circuits for preventing the high-energy transmitter firing signal of FIG. 2B from either being mistaken as a receiver signal or damaging the receiver circuits. To this end, the trailing edge of the positive portion of the multivibrator signal of FIG. 2A energizes a "gate delay one-shot" 44 whose waveform is shown in FIG. 2E. The trailing edge of the delay pulse of FIG. 2E energizes a "gate one-shot" 45 whose output waveform is shown in FIG. 2F. The "gate one-shot" 45 then operates to energize the gates 39 and 41. By inspection of the voltage-timing diagrams of FIGS. 2A—2G, it can be seen that the enable gates 39 and 41 will be deenergized during the transmitter firing and then will be energized or opened to allow the received signal of FIG. 2C to pass through the receiver channel. To further ease the design criteria of the receiver channel, the limiter circuit 38 operates to chop off a substantial portion of the transmitter firing signal.

Now concerning the detector circuit 27 in greater detail, and referring to FIGS. 1 and 3A—3I in conjunction, the normalized pulses of FIG. 3A are applied to the detector circuit 27 which operates to discriminate between the $S_{on}$ and $S_{xn}$ pulses. Thus, inside the detector circuit 27, a $S_{on}$ discriminator 50 (e.g., a Schmitt trigger) which has a voltage threshold level sufficiently high to detect genuine $S_{on}$ pulses and reject most noise pulses, generates a shaped pulse, designated $T_o$ and shown in FIG. 3B, for each genuine $S_{on}$ pulse supplied to the detector circuit 27. A $S_{xn}$ discriminator 51 is responsive to the negative going $S_{xn}$ discriminator, like the $S_{on}$ discriminator has a threshold level sufficiently great to detect genuine $S_{xn}$ pulses and ignore most noise pulses.

The positive going edges of these output pulses from discriminator 51 trigger a "$T_o$ inhibit one-shot" 52 which operates to generate a negative going pulse shown in FIG. 3G. When unenergized, the output of the "$T_o$ inhibit one0-shot" 52 will be at the "1" level to enable an AND gate 53. The enabled AND gate 53 passes each $T_o$ pulse to energize a "$T_x$ enable one-shot" 54 on the positive going edge to produce the negative pulses of FIG. 3C. The leading or falling edge of each of these FIG. 3C pulses from one-shot 54 energizes a "single $T_o$ one-shot" 55 whose output pulses are shown in FIG. 3D. These pulses from one-shots 54 and 55 are combined in an AND gate 58 and when both pulses are at the "1" level, the pulse of FIG. 3E is generated to enable an AND gate 58 and hold a "memory flip-flop" 57 in its set state via its DC set input.

The trailing edges of the pulses from discriminator 51 trigger a "memory flip-flop" 57 to its reset state. (It is always reset when triggered because the AC set input is grounded.) The normal output of the "memory flip-flop" 57 is shown in FIG. 3H. A coincidence of the FIGS. 3E, F and G pulses from AND gate 58, $S_{xn}$ discriminator 51, and the normal output of "memory flip-flop" 57 causes AND gate 56 to generate the $T_x$ pulse of FIG. 3I. This $T_x$ pulse accurately corresponds in time to the $S_x$ reflected or received energy pulse transmitted over the cable 25 from the downhole signal control circuit 24.

It can thus be seen that by the arrangement of circuit elements in the detector circuit 27, only one $S_{on}$ pulse can be detected per $S_{rn}$ pulse since each $S_{rn}$ pulses causes the "$T_o$ inhibit one-shot" 52 to disable the AND gate 53 for a time period extending up until just prior to the arrival of the next $T_o$ pulse. Moreover, only one $T_x$ pulse can be detected per $T_o$ pulse because of the operation of the one-shots 54 and 55, AND gates 58 and 56, and memory flip-flop 57. Thus, the "single $T_o$ one-shot" 55 will prevent a spurious $S_o$ type pulse from upsetting the detecting operation since this one-shot cannot be retriggered during its timing cycle. The enable $T_x$ detection one-shot operates in conjunction with the "single $T_o$ one-shot" 55 and the AND gate 58 to enable the AND gate 56 only when an $S_{rn}$ pulse is expected. Since the memory flip-flop 56 is reset by the trailing edge of each output pulse from the $S_{rn}$ discriminator 51, the AND gate 56 is disabled by the flip-flop 57 being in its reset state. When the flip-flop 57 is set, the AND gate 56 will still be disabled since the AND gate 58 will be off. Then, the next-detected $S_o$ pulse starts the operation all over again. These $T_o$ and $T_x$ pulses are applied to the caliper computing circuit 28 for further processing.

The description and operation of the signal control circuit 24 and detector circuit 27 are set forth in greater detail in copending application Ser. No. 827,799 by Joseph E. Chapman filed on May 26, 1969.

Now referring to FIGS. 4A, 4B and 5A—5P in conjunction, FIGS. 4A and 4B show the caliper computing circuit 27 of FIG. 1 in greater detail and FIGS. 5A—5P show the waveform display of various signals in the FIG. 4 circuit. First referring to FIG. 4A, the leading edge of the $T_o$ pulses, shown in FIG. 5A, energize a "delayed $T_o$ one-shot" 65 which produces the "delayed $T_o$ pulse" of FIG. 5B. The trailing edge of the "-delayed $T_o$ pulse" sets an "integrator flip-flop" 66 whose normal output energizes an "integrator current switch" 67 which comprises a gated constant current source for producing negative current flow. The constant current generated by the "integrator current switch" 67 is integrated by a suitable integrator 68 comprising an operational amplifier 69 and feedback capacitor 70, by way of a variable resistor 71 which adjusts the charging current in accordance with the value of well bore mud velocity. This charging current is applied to the inverting input of the operational amplifier 69 so that the output thereof will increase in a positive direction in response to the negative charging current from the "integrator current switch" 67. The leading edges of the $T_x$ pulses, shown in FIG. 5C, toggle the "integrator flip-flop" 66 so as to change its state from the normal to complement state to thereby deenergize the "current switch" 67.

Thus, as shown in FIG. 5D, charging current will be applied to the integrator 68 from a time beginning with the trailing edge of each "delayed $T_o$ pulse" of FIG. 5B and terminating with the leading edge of each $t_x$ pulse of FIG. 5C. The resulting output of the integrator 68 is shown in FIG. 5E. It can thus be seen that the voltage level to which the integrator 68 charges will be representative of the time interval between the end of the "delayed $T_o$ pulse" of FIG. 5B and beginning of the subsequent $T_x$ pulse of FIG. 5C. Since the duty cycle of the "-delayed $T_o$ one-shot" 65 is constant, the voltage on the output of the integrator 68 will be proportional to the time interval between each set of $T_o$ and $T_x$ pulses minus an offset. This offset corresponds to the duty cycle of the "delayed $T_o$ one-shot" 65 and is chosen such that the integrator 68 will start charging when the transmitter 22 is fired. (Recall that $S_o$ is transmitted to the surface of the earth prior to the time of transmitter firing.)

To transfer the voltage reading on the integrator 68 to subsequent circuits, the leading edge of each $T_x$ pulse energizes a "data transfer one-shot" 72 whose output pulse is shown in FIG. 5G. This "data transfer pulse" energizes a "data transfer gate" 73 which transfers the voltage stored by the integrator 68 to a storage capacitor 74.

To reset the integrator 68, the leading edge of each $T_o$ pulse energizes an "integrator reset one-shot" 75 whose output pulse is shown in FIG. 5F. This "integrator reset pulse" energizes an inhibit gate 76 which connects a negative DC voltage source to the cathode of a diode 77 when unenergized. The anode of diode 77 is connected to the anode of a diode 78 whose cathode is connected to the inverting input terminal of the operational amplifier 69. A positive voltage source is connected via a resistor 79 to the junction between the anodes of diodes 77 and 78. Now, when the inhibit gate 76 is deenergized, current will flow through resistor 79, diode 77, and gate 76 to the negative voltage source. However, when gate 76 is energized by an "integrator reset pulse," diode 77 turns off and current flows through resistor 79 and diode 78 to the inverting input of the operational amplifier 69, thus causing the output thereof to go negative to begin discharging capacitor 70, as seen in FIG. 5E.

To shut off this reset operation when the output of operational amplifier 69, and thus integrator 68, has discharged to a suitable reference voltage, e.g., zero volts, an operational amplifier 80 compares this output voltage with zero volts (ground) and terminates the reset operation when this reference voltage is reached by the output of operational amplifier 80. To accomplish this, a selected fraction of the output voltage from the operational amplifier 69 is supplied to the noninverting input of the operational amplifier 80 by way of a voltage-dividing network comprising resistors 81 and 82. The inverting input to amplifier 80 is connected to ground and the output thereof is connected to the cathode of a diode 83 whose anode is connected to the junction between diodes 77 and 78. By this arrangement, the diode 83 will be cut off while the integrator 68 is charging up or resetting since the output of operational amplifier 80 will be at a large positive value (larger than the voltage at the junction between diodes 77 and 78 because of the gain of amplifier 80) until the integrator output voltage decreases below zero volts. When this integrator output voltages does go below zero volts, the output of operational amplifier 80 will go negative thus causing diode 83 to conduct and draw the reset current passing through resistor 79 away from the diode 78. As seen in FIG. 5E, there will be a slight overshoot on the output voltage from integrator 68 because of the current response time.

Since the integrator reset operation always occurs prior to the setting of the "integrator flip-flop" 66, i.e., the timing cycle of the "integrator one-shot" 75 is less than the timing cycle of the "delayed $T_o$ one-shot" 65, the integrator 68 will always be reset prior to the integrating operation and the subsequent data transfer to capacitor 74.

Now turning to FIG. 4B, a high input impedance buffer amplifier 85 is responsive to the voltage stored on the storage capacitor 74 for applying this voltage to a maximum peak detector 88 and a minimum peak detector 87. Additionally, this output voltage from the buffer amplifier 85 is applied to the recorder 29 by way of other processing circuits to provide an indication of the average borehole radius or diameter. This output voltage from buffer amplifier 85 is shown in FIG. 5H.

Although the "delayed $T_o$ one-shot" 65 operates to remove the time offset between $T_o$ and the actual transmitter firing, there is another offset which should be accounted for. The transducer 22 is, in reality, offcentered from the center axis of the well tool 15 and thus from the center axis of the well bore. Additionally, the acoustic energy must travel some small interval inside the well tool 15 before passing into the well bore fluid. More than likely, the characteristic acoustic velocity of the material inside the well tool 15 is different from that of the well bore fluid. The offset produced by both of the above affects is added back in through use of a summing network comprising an operational amplifier 88 and two summing resistors 89 and 90 which are connected to the output of buffer amplifier 85 and a positive DC voltage source respectively. The ratio of the values of resistors 89 and 90 are selected to provide the proper offset cancellation. By so doing, the output signal from amplifier 88 will be directly proportional to the well bore radius or diameter.

This output signal from the amplifier 88 is filtered by a suitable low-pass filter 91 which operates to filter out rapid fluctuations caused by the data transfer operation. The resulting filtered output signal, shown in FIG. 5M, is then passed to channel 3 of the recorder 29 via a scale selection circuit 92. This scale selection circuit 92 operates to set in a desired amount of resolution and zero offset into the caliper measurements by proper positioning of a pair of switches 93 and 94. The first switch 93 connects the output of the low-pass filter 91 to the recorder 29 via a selected one of three resistors $R_1$, $R_2$, or $R_3$. The switch 94 connects the recorder 29 input terminal to a negative DC voltage source via a selected resistor $R_4$, $R_5$, or $R_6$. The higher the value of the resistor selected by switch 93, the smaller is the recording resolution and the higher is the zero offset. On the other hand, the higher the value of the resistor selected by switch 94, the lower is the zero offset and the higher is the resolution. Thus, as an example, proper positioning of the switches 93 and 94 with appropriate resistance values for resistors $R_1-R_6$ could produce the following scale selections for full scale deflection: 3—12 inches, 3—6 inches, 4—5 inches, 5—8 inches, etc.

The maximum peak detector 86 operates to detect the maximum voltage level of the output voltage from buffer amplifier 85 for each revolution or so of the rotating transducer 22 and thus has a fast charging rate and extremely slow discharge rate. To accomplish this, the output signal of FIG. 5H is passed to the cathode of a diode 100, the anode thereof being connected to the base of an NPN transistor 101 and through a base resistor 102 to a positive DC voltage source. When the voltage output of buffer amplifier 85 is greater than the voltage across a capacitor 103 which is connected between the emitter of transistor 101 and ground, the diode 100 will be cut off so that base current will flow through the base resistor 102. This causes the transistor 101 to conduct via a collector resistor 104 and normally deenergize inhibit gate 105 until the capacitor 103 charges up to equal the voltage at the cathode of diode 100. When these two voltages are substantially equal, the diode 100 turns off to draw off the current passing through the base resistor 102 to thus turn the transistor 101 off. The diode 100 and transistor 101 are selected such that the voltage drop across the diode 100 will about equal the base to emitter drop of the transistor 101 so that the voltage across the capacitor 103 will substantially equal the voltage at the cathode of the diode 100.

Referring to FIGS. 5H and 5I in conjunction with FIG. 4B, where FIG. 5I shows the voltage across capacitor 103, the diode 100 will be conducting so long as the voltage output of buffer amplifier exceeds the voltage across capacitor 103, as shown at the point 106 in FIG. 5H and will only become nonconductive when the transferred voltage of FIG. 5H exceeds the voltage across the capacitor 103, as illustrated at the point 107 in FIG. 5I. Thus, the capacitor 103 will always charge to an applied voltage higher than the presently stored voltage and thus will store the highest applied peak voltage until the maximum peak detector 86 is reset.

The resulting peak amplitude detected by the maximum peak detector 86 is transferred to the storage capacitor 110 by way of a transfer gate 111. An asymmetrical abstable multivibrator 112 having a period which is slightly greater than the time for the rotating transducer 22 to make one complete revolution around the borehole, energizes the transfer gate 111 for transferring the measured peak voltage to the storage capacitor 110 approximately once per revolution of the borehole wall. This peak detection transfer signal is shown in FIG. 5K and the resulting transferred voltage is shown in FIG. 5N. The voltage stored on capacitor 110 is applied via a high input impedance buffer amplifier 118 and a summing resistor 119 to the input of an operational amplifier 120. To add in the above-described offset due to the dead center offset of transducer 22, etc., current is supplied through a summing resistor 121 to the input of amplifier 120 to thus add an offset to the signal from buffer amplifier 118.

The output signal from amplifier 120 is then passed to a low-pass filter 122 which operates to remove any ripple arising from the reset or data transfer operation of the detector 86. This filtered output signal is then applied to a scale selection circuit 123 which operates in the same manner as the scale selection circuit 92 and is mechanically ganged to the switches 93 and 94 of scale selection circuit 92. The output signal from scale selection circuit 123 is applied to the recorder 29 to produce a record of the maximum radius or diameter per 360° (approximately) well bore scan. After the voltage stored by the maximum peak detector 86 has been transferred, the trailing or falling edge of each pulse from the multivibrator 112 energizes a reset one-shot 113. The resulting pulse, shown in FIG. 5L, resets the maximum peak detector 86 to a desirable low-value reference voltage in readiness for another cycle of operation. It should be noted here that the period of abstable multivibrator 112 is desirably slightly greater than the time for rotating transducer 22 to make one complete revolution or 360° scan of the well bore wall so that vertical defects in the well bore wall will not be masked by this reset operation.

Concerning this reset operation in greater detail, the reset pulse of FIG. 5L energizes the inhibit gate 105 to disconnect the transistor 101 from its DC source and also energizes an enable gate 114 which connects the capacitor 103 to ground through a low-value resistor 115. As seen by comparing FIGS. 5I and 5L, the voltage across capacitor 103 quickly discharges to zero volts whenever the reset one-shot 113 generates a reset pulse. The reason for disconnecting the collector of transistor 101 from its DC voltage source is to prevent leakage current passing through transistor 101 during the reset operation. As illustrated in FIGS. 5G, 5H and 5I, the next data transfer pulse 116 of FIG. 5G produces the transfer voltage of FIG. 5H and the capacitor 103 charges up to this voltage as seen in FIG. 5I. The maximum peak detector 86 then continues to charge up to higher voltages and ignore lower voltages until the next peak detector reset pulse, etc.

Now concerning the minimum peak detector 87 circuitry, the minimum peak detector 87 operates to measure the minimum peak voltage per revolution (or so) of the rotating transducer 22. To accomplish this, the minimum peak detector 87 circuitry is arranged essentially the same as the maximum peak detector 86 circuitry and each corresponding element has the same numeral designation with only the addition of the letter "$a$" after each number in the detector 87. The only differences between the two circuits are that the transistor 101$a$ is a PNP type, the diode 100$a$ is reversed, the bias resistor 102$a$ and inhibit gate 105$a$ are connected to a negative DC voltage source, and the enable gate 114$a$ is connected to a positive DC voltage source instead of ground.

In operation, the diode 100$a$ will be nonconductive whenever the transfer voltage of FIG. 5H is less than the voltage stored by capacitor 103$a$ thus enabling base current to flow through the base resistor 102$a$ and turn transistor 101$a$ on. The transistor 101$a$ will conduct until enough charge has been withdrawn from the capacitor to make the voltage stored by capacitor 103$a$ equal to the voltage at the anode of diode 100$a$. If the transfer voltage from buffer amplifier 85 should rise above the voltages stored by capacitor 103$a$, the diode 100$a$ will conduct thus turning the transistor 101$a$ off and maintaining the stored voltage on capacitor 103$a$ at its previous low value. By this arrangement, as seen in FIG. 5J, the stored voltage on capacitor 103$a$ will reflect the lowest voltage which has been applied to the minimum peak detector 87 between resets. Thus, to reset the detector 87, the reset pulse of FIG. 5L from the reset one-shot 113 energizes the enable gate 114$a$ to charge capacitor 103$a$ up to a voltage level higher than the highest amount of anticipated transfer voltage from the buffer amplifier 85. This reset operation can be seen by comparing FIGS. 5L and 5J. Then, the next data transfer pulse 116 of FIG. 5G causes the capacitor 103$a$ to discharge to the level of the transfer voltage of FIG. 5H, as seen in FIG. 5J. The operation then continues as earlier discussed.

To transfer the detected minimum voltage, the peak detector transfer pulse of FIG. 5K from the multivibrator 112 energizes a transfer gate 125 which operates to transfer the voltage from the capacitor 103a to a storage capacitor 126. This stored voltage on capacitor 126 is then supplied via a high input impedance buffer amplifier 127 and an input summing resistor 128 to an operational amplifier 129. The earlier discussed offset (offcentering of transducer 22, etc.) is added back in by the current passing through a summing resistor 130. The output signal from the amplifier 129 is then passed via a low-pass filter 131 and scale selection circuit 132 to the recorder 29 to produce an indication of the minimum borehole radius or diameter per 360° (approximately) revolution or scan of the borehole wall. The scale selection circuit 132 operates in the same manner as the scale selection circuits 92 and 123 and is mechanically ganged thereto.

Returning to FIG. 4A, in the event that a $T_x$ pulse is not received by the caliper circuit 28, the integrator 68 would continue charging until reset by the "integrator reset pulse" of FIG. 5F from the "integrator reset one-shot" 75. This, then, would result in a very large integrator voltage level. Although this large voltage would not be transferred to the storage capacitor 74 because the $T_x$ itself initiates the data transfer operation, inaccurate radius or diameter readings could result because the storage capacitor 74 would not be updated. While an occasional missing $T_x$ occurrence could be tolerated, a relatively large number of such occurrences may give inaccurate readings. In this connection, it would be desirable to provide a means for indicating the absence of $T_x$ pulses.

Thus, referring to FIG. 4, the normal and complementary outputs of the "integrator flip-flop" 66 are connected to the set and reset inputs respectively of a "missing $T_x$ flip-flop" 135. The flip-flop 135 is clocked by the $T_o$ pulses, i.e., a coincidence of a $T_o$ pulse on the clock input and a "1" on either the set or reset input is required before the flip-flop 135 will change to its normal or complementary states respectively. Thus, if the "integrator flip-flop" 66 is still in its set or normal state when the $T_o$ pulse appears, the "missing $T_x$ flip-flop" 135 will be placed in its set or normal state. If, on the other hand, the "integrator flip-flop" 66 has been reset by a $T_x$ pulse before the next $T_o$ pulse appears, the "missing $T_x$ flip-flop" 135 would be placed in its reset or complementary state. Since the normal output of flip-flop 135 being at the "1" level indicates missing $T_x$ pulses, this normal output is applied to channel 4 of recorder 29 to indicate such an occurrence.

From the foregoing, it can be seen that apparatus has been shown for accurately and continuously providing indications of the average well bore radius, maximum and minimum well bore radius per approximate 360° scan of the well bore wall. These maximum and minimum indications give a measure of the well bore eccentricity. Additionally, indications of the reliability of the above measurements are also provided by monitoring the $T_x$ pulses to see if any are missing.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What I claim is:

1. In well bore radius measuring apparatus of the type where a well tool emits energy into a media surrounding said well tool and receives energy reflected back from a well bore wall and produces electrical pulses representative of the times at which energy is emitted and received, apparatus for processing said pulses to provide radius measurements, comprising:
    means responsive to each energy emitted pulse for generating a delayed pulse a given time interval after each energy-emitting pulse;
    means for producing a pulse of constant current having a time duration representative of the time interval between each delayed pulse and a subsequent received energy pulse;
    means for integrating said current pulse to produce an output voltage representative of the time spacing between successive energy emitted and energy received pulses to thereby produce a measure of the radius of a well bore; and
    means responsive to each energy emitted pulse for resetting said integrating means to an initial reference voltage.

2. The apparatus of claim 1 wherein said constant current pulse producing means includes a first bistable means adapted to be set and reset by said delayed and energy received pulses, and constant-current means gated by one output of said bistable means for producing said constant-current pulse; and further including means for checking the authenticity of said radius measurements, including gated bistable means adapted to be set and reset by selected outputs of said first bistable means and gated by said energy emitted pulse whereby a selected output of said gated bistable means will assume a given state whenever an energy-received pulse is missed.

3. The apparatus of claim 1 wherein said resetting means includes means for comparing the output voltage of said integrating means with said initial reference voltage and supplying current to the input of said integrating means of an opposite polarity from said current pulse until said integrating means output voltage is substantially equal to said initial reference voltage.

4. The apparatus of claim 1 and further including means responsive to the energy received pulses for transferring the voltage output of said integrating means to a storage means for subsequent use in providing well bore radius indications.

5. The apparatus of claim 4 and further including means responsive to said stored integrator output voltage for measuring one of the maximum or minimum amplitude levels of said stored output voltage over a selected time interval to thereby obtain a measure of the maximum or minimum radius of a well bore over a selected well bore interval.

6. Apparatus for measuring the radius of a well bore, comprising:
    a well tool having transducer means for directionally emitting energy into a media surrounding said well tool and receiving energy reflected back from a well bore wall, means for rotating said transducer means so that said emitted energy will be sequentially directed at various circumferential portions of a well bore wall, circuit means for repetitively energizing said transducer means to emit energy and developing electrical pulses representative of the times at which energy is emitted and received by said transducer means;
    means responsive to each energy-emitted pulse for generating a delayed pulse a given time interval after each energy-emitting pulse;
    means for producing a pulse of constant current having a time duration representative of the time interval between each delayed pulse and a subsequent received energy pulse;
    means for integrating said current pulse to produce an output voltage representative of the time spacing between successive energy-emitted and energy-received pulses to thereby produce a measure of the radius of a well bore; and
    means responsive to each energy-emitted pulse for resetting said integrating means to an initial reference voltage.

7. In well bore radius measuring apparatus of the type where a well tool emits energy into a media surrounding said well tool and receives energy reflected back from a well bore wall and produces electrical pulses representative of the times at which energy is emitted and received, apparatus for processing said pulses to provide radius measurements, comprising:
    means responsive to said pulses for generating a constant-current pulse having a time duration representative of the time relationship of said energy-emitted and energy-received pulses to one another;

means for integrating each constant-current pulse to produce an output voltage representative of the time spacing between successive energy-emitted and energy-received pulses to thereby produce a measure of the radius of a well bore; and means for periodically resetting said integrating means including means for comparing the output voltage of said integrating means with a reference voltage and supplying current to the input of said integrating means of an opposite polarity from said current pulse until said integrating means output voltage is substantially equal to said reference voltage to thereby reset said integrating means.

8. Apparatus for measuring the radius of a well bore, comprising:

a well tool having transducer means for directionally emitting energy into a media surrounding said well tool and receiving energy reflected back from a well bore wall, means for rotating said transducer means so that said emitted energy will be sequentially directed at various circumferential portions of a well bore wall, circuit means for repetitively energizing said transducer means to emit energy and developing electrical pulses representative of the times at which energy is emitted and received by said transducer means;

means responsive to said pulses for generating a constant-current pulse having a time duration representative of the time relationship of said energy-emitted and energy-received pulses to one another;

means for integrating each constant-current pulse to produce an output voltage representative of the time spacing between successive energy-emitted and energy-received pulses to thereby produce a measure of the radius of a well bore;

means for periodically resetting said integrating means including means for comparing the output voltage of said integrating means with a reference voltage and supplying current to the input of said integrating means of an opposite polarity from said current pulse until said integrating means output voltage is substantially equal to said reference voltage to thereby reset said integrating means.

9. In well bore radius measuring apparatus of the type where a well tool emits energy into a media surrounding said well tool and receives energy reflected back from a well bore wall and produces electrical pulses representative of the times at which energy is emitted and received, apparatus for processing said pulses to provide radius measurements, comprising:

means for measuring the time separation between each set of said energy-emitting and energy-received electrical signals and providing an output signal whose amplitude is representative thereof;

means for measuring one of the maximum or minimum amplitude levels of said output signal to provide a measure of the maximum radius of a well bore, said maximum or minimum measuring means including storage means, means for maintaining the voltage stored by said storage means substantially equal to one of the highest or lowest amplitude levels of said output signal; and means for repetitively resetting said storage means maximum or minimum to an initial reference amplitude at selected time intervals so that said stored voltage will reflect the maximum or minimum well bore radius over a selected well bore interval.

10. Apparatus for measuring the radius of a well bore, comprising:

a well tool having transducer means for directionally emitting energy into a media surrounding said well tool and receiving energy reflected back from a well bore wall, means for rotating said transducer means so that said emitted energy will be sequentially directed at various circumferential portions of a well bore wall, circuit means for repetitively energizing said transducer means to emit energy and developing electrical pulses representative of the times at which energy is emitted and received by said transducer means;

means for measuring the time separation between each set of said energy-emitting and energy-received electrical signals and providing an output signal whose amplitude is representative thereof;

means for measuring the maximum amplitude level of said output signal to provide a measure of the maximum radius of a well bore, said maximum measuring means including storage means, means for maintaining the voltage stored by said storage means substantially equal to the highest amplitude level of said output signal; and means for repetitively resetting said storage means to an initial reference amplitude at selected time intervals which intervals are at least as great as the time for said transducer means to make one complete revolution around a well bore so that a measure of the maximum well bore radius per approximate revolution of the transducer means can be obtained.

11. The apparatus of claim 10 wherein said maintaining means of said maximum amplitude measuring means includes polarity-sensitive means for supplying current to said storage means when the voltage stored by said storage means is less than the amplitude level of said output signal to thereby cause said storage means to charge up to approximately the amplitude level of said output signal.

12. The apparatus of claim 10 wherein said means for measuring the maximum amplitude level to provide a measure of the maximum well bore radius further includes means synchronized with said resetting means for repetitively sampling the voltage stored by said storage means at a time prior to the reset of said storage means to thereby provide an indication of the maximum well bore radius.

13. Apparatus for measuring the radius of a well bore, comprising:

a well tool having transducer means for directionally emitting energy into a media surrounding said well tool and receiving energy reflected back from a well bore wall, means for rotating said transducer means so that said emitted energy will be sequentially directed at various circumferential portions of a well bore wall, circuit means for repetitively energizing said transducer means to emit energy and developing electrical pulses representative of the times at which energy is emitted and received by said transducer means;

means for measuring the time separation between each set of said energy-emitting and energy-received electrical signals and providing an output signal whose amplitude is representative thereof;

means for measuring the minimum amplitude level of said output signal to provide a measure of the minimum radius of a well bore, said minimum measuring means including storage means, means for maintaining the voltage stored by said storage means substantially equal to the lowest amplitude level of said output signal; and means for repetitively resetting said storage means to an initial reference amplitude at selected time intervals which intervals are at least as great as the time for said transducer means to make one complete revolution around a well bore so that a measure of the minimum well bore radius per approximate revolution of the transducer means can be obtained.

14. The apparatus of claim 13 wherein said maintaining means of said minimum amplitude measuring means includes polarity-sensitive means for drawing charge from said storage means when the voltage stored by said storage means is greater than the amplitude level of said output signal to thereby cause said storage means to discharge to approximately the amplitude level of said output signal.

15. The apparatus of claim 13 wherein said means for measuring the minimum amplitude level to provide a measure of the minimum well bore radius further includes means synchronized with said resetting means for repetitively sampling the voltage stored by said storage means at a time prior to the reset of said storage means to thereby provide an indication of the minimum well bore radius.

16. Apparatus for measuring the radius of a well bore, comprising:

a well tool having transducer means for directionally emitting energy into a media surrounding said well tool and receiving energy reflected back from a well bore wall, means for rotating said transducer means so that said emitted energy will be sequentially directed at various circumferential portions of a well bore wall, circuit means for repetitively energizing said transducer means to emit energy and developing electrical signals representative of the times at which energy is emitted and received by said transducer means;

means for measuring the time separation between each set of said energy-emitting and energy-received electrical signals and providing an output signal whose amplitude is representative of the radius of a well bore;

scale selection means for attenuating said output radius signal by a selected amount and subtracting a selected voltage from said output radius signal to produce a scale selected output signal; and means for recording said scale selected output signal whereby the selected attenuation and subtraction voltage will determine the particular scale to which the radius measurements are recorded.